INVENTORS:
DARREL M. WARNER,
GERALD A. LUNDE
BY
D. Gordon Agnus
ATTORNEY

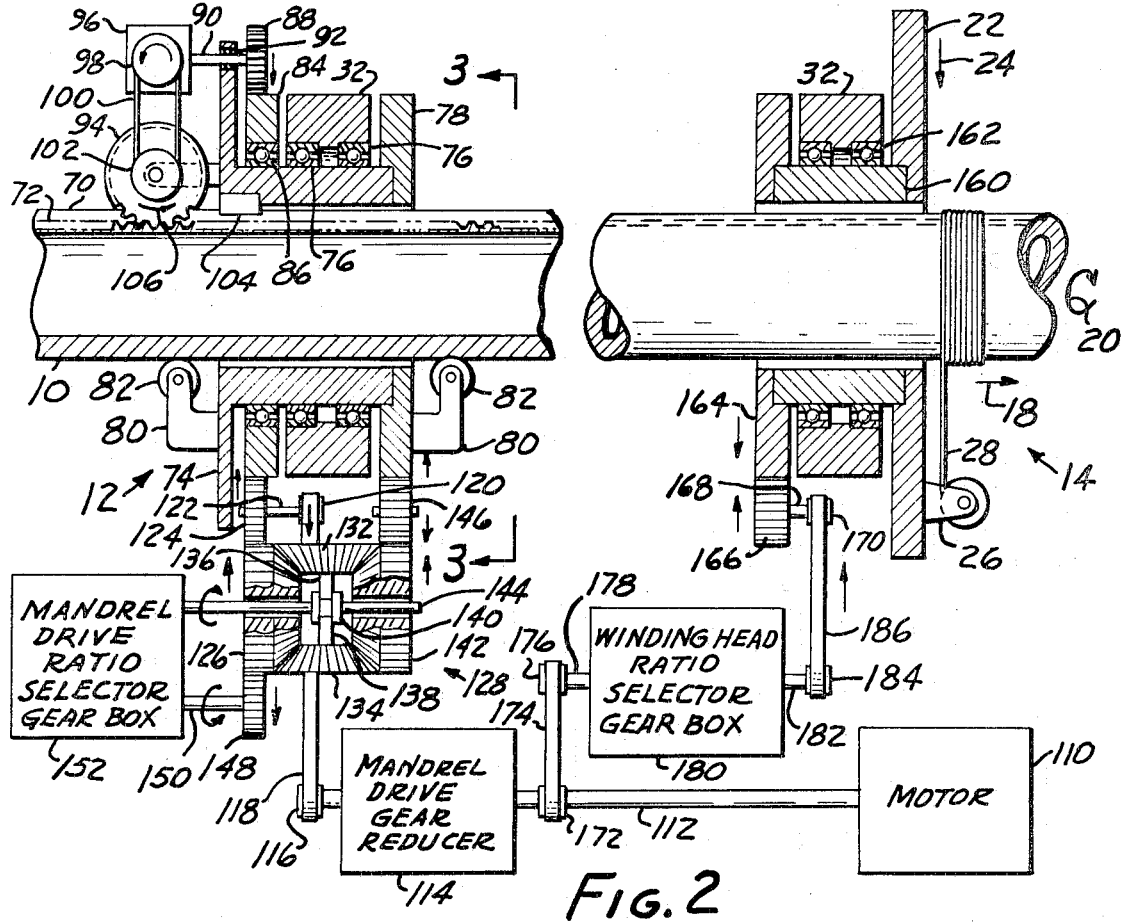
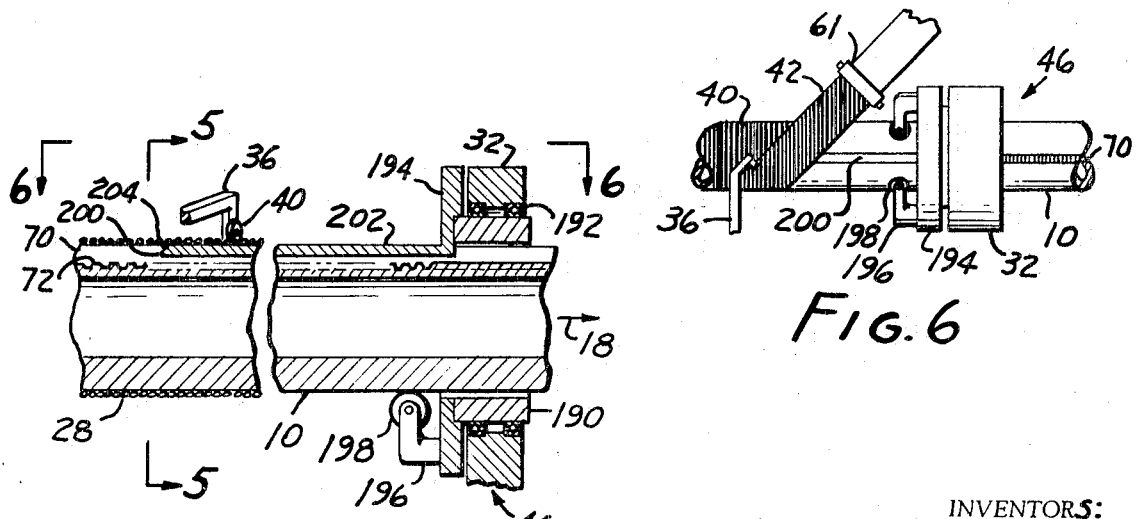

United States Patent Office 3,551,254
Patented Dec. 29, 1970

---

3,551,254
METHOD AND APPARATUS FOR WINDING FILAMENT MATERIAL
Darrel M. Warner, West Covina, and Gerald A. Lunde, Rowland Heights, Calif., assignor to Aerojet-General Corporation, El Monte, Calif., a corporation of Ohio
Filed Apr. 5, 1968, Ser. No. 719,196
Int. Cl. B31c *3/00;* B65h *19/00*
U.S. Cl. 156—426          28 Claims

---

ABSTRACT OF THE DISCLOSURE

This disclosure relates to methods and apparatus for winding filament material, and particularly to methods and apparatus for producing filament bias material of extended length.

According to the present disclosure, winding apparatus is provided wherein a mandrel is rotated about its axis and is moved along its axis. Guide means is provided for guiding filament material onto the mandrel as it is rotated and moved, and drive means is provided for rotating the guide means about the mandrel axis.

According to the method of the present disclosure, a mandrel is continuously rotated about its axis. Filament material is wound onto the mandrel by rotating a supply of filament material about the mandrel axis. The filament material applied to the mandrel is then cut from the mandrel at a desired bias angle to produce a ribbon of bias material of extended length.

---

This invention relates to winding apparatus and methods and particularly to winding apparatus and methods for producing bias material containing filament material disposed at an angle of between 0° and 90° to the length of the ribbon.

The term "bias material" as used herein means a ribbon of material having an extended length which includes filament material disposed at an angle of between 0° and 90° to the length of the ribbon. The term "bias material" is intended to include ribbon material having filament material disposed at 0° or 90°.

Bias material is used for many purposes. By way of example, pressure vessels, such as inflatable tires, include filament reinforcement in the nature of cords disposed at an angle to the transverse of the tire circumference. Heretofore, bias material has been constructed by laying out a strip or ribbon of supporting material, such as rubber, and applying filament strands to the material. A bonding agent was usually applied to the rubber so that the filament remained in place on the material. In many instances, the filament material was applied to the rubber by hand, thereby resulting in a tedious and time consuming operation. Furthermore, the ribbon of bias material was short due to the inability to properly manipulate a relatively long ribbon thereby resulting in a ribbon of bias material sufficient for only a few tires.

United States Letters Pat. No. 1,355,525 to Erle K. Baker issued Oct. 12, 1920 discloses a machine for making bias material. According to the Baker patent, rubber supporting material is applied over a cylindrical mandrel. Filament material is then helically wound over the supporting material on the mandrel by rotating a winding head around a non-rotating mandrel while moving the mandrel longitudinally along its axis. The resulting cord construction is cut longitudinally along the mandrel to form a ribbon having filament cord construction disposed at a desired bias angle.

The system disclosed in the Baker patent has some major drawbacks. First, several hundred winding heads were required for winding the material onto the rubber to assure the proper bias angle and to maintain the filament density necessity for bias material. Secondly, the length of the ribbon of bias material produced by the Baker system was limited by the length of supporting material on the mandrel. Since the ribbon could be no longer than the supporting material, which in turn could be no longer than the mandrel, the apparatus could be used for producing only a few feet of bias material, which was sufficient for only one or two tires.

Later, another system was developed which is described in United States Letters Pat. No. 1,747,652 granted to Frank A. Seiberling on Feb. 18, 1930. According to the Seiberling patent, rubber supporting material is applied over a cylindrical mandrel. Filament material is then helically wound over the supporting material on the mandrel. Unlike the Baker patent which applied the filament winding to the mandrel by rotating a winding head around a non-rotating mandrel, Seiberling directed a large number of strands of filament from a creel at a specified angle to the length of the mandrel, and rotated the mandrel while holding the filament supply stationary. A cutter was then placed against the cord construction wrapped on the mandrel, and a ribbon of filament material, backed with support material, was cut from the mandrel.

Although the Seiberling system was capable of producing a continuous ribbon of bias material, it too had the problem of requiring a large number of supplies of filament material. As a matter of fact, to produce a ribbon of bias material having the necessary width for use in an ordinary automobile tire, it was necessary to provide 1120 separate spools of filament material feeding onto the cylindrical mandrel. The large number of spools often required a separate creel room, thereby requiring use of valuable space. If any spool ran out of filament material or if one or more strands of filament broke along its length, the apparatus had to be shut down to repair the filament material or replace the spool before further production of reinforcement material could be achieved. The maintenance and repair of the apparatus and particularly of the large number of supplies of filament material was involved and costly.

Another problem associated with both the Baker and Seiberling systems is that they are not readily adjustable to produce bias material having the filament material disposed at various selected bias angles.

It is an object of the present invention to provide a method and apparatus for winding filament material for producing bias material of extended length having filament material disposed at an angle to the length of the ribbon.

Another object of the present invention is to provide apparatus for producing a continuous ribbon of bias material which requires less supplies of filament material than heretofore achieved in the art.

Another object of the present invention is to provide apparatus and method for producing a ribbon of bias material having an extended length wherein the bias angle of filament material may be selected.

Another object of the present invention is to provide apparatus for producing bias material requiring less space than herefore required.

Another object of the present invention is to provide a method of producing bias material.

Acording to the present invention, winding apparatus is provided having a rotatable winding head for rotating about the axis of a substantially cylindrical mandrel. The mandrel is also revolved about its axis while being moved longitudinally along its axis.

The winding head is rotated about the mandrel axis, so as to wind filament material onto the mandrel. The speed of rotation of the winding relative to the speed of rotation of the mandrel is preferably greater than the speed of rotation of the mandrel relative to a stationary plane. Cutting means is provided for cutting a continuous ribbon of bias material from the mandrel.

The speed of rotation of the mandrel and the longitudinal speed of the mandrel are determinative of the bias angle of the bias material withdrawn from the mandrel, the rate at which the bias material is moved being dependent upon the rotation speed of the mandrel. By rotating the winding head about the rotating mandrel, each filament supply provides several convolutions of filament material on the mandrel for each revolution of the mandrel, the number being dependent upon the rotational speed of the winding head. Thus, the number of filament supplies necessary to obtain a specific number of convolutions of filament material need not be as great as the number of supplies used in prior apparatus. For example, if the winding head revolves around the mandrel ten times during each revolution of the mandrel, each filament supply produces ten convolutions of filament material on the mandrel during each revolution of the mandrel, and the number of filament supplies may accordingly be reduced tenfold than the number required in previous systems for obtaining the same number of convolutions of filament winding.

According to an optional and desirable feature of the present invention, selection means is provided for selectively adjusting the speed of rotation of the mandrel with respect to the advancement of the mandrel along its axis, and for selectively adjusting the speed of rotation of the drive means. By selectively adjusting the rotation of the winding head around the mandrel, as well as the rotation and axial movement of the mandrel, the bias angle of the filament material may be altered and proper filament density may be obtained.

According to another optional and desirable feature of the present invention, means is provided for wrapping supporting material onto the mandrel before winding filament material thereon.

The above and other features of the present invention will be more fully understood from the following detailed description and the accompanying drawings, in which:

FIG. 2 is a side view in cutaway cross-section of a portion of the winding apparatus illustrated in FIG. 1, together with a diagrammatic illustration of one form of a drive mechanism for the apparatus;

FIG. 4 is a side view in cutaway cross-section of a guide mechanism for use in the invention illustrated in FIG. 1;

FIG. 6 is a top view elevation of the guide mechanism taken at line 6—6 in FIG. 4.

Figure 1:
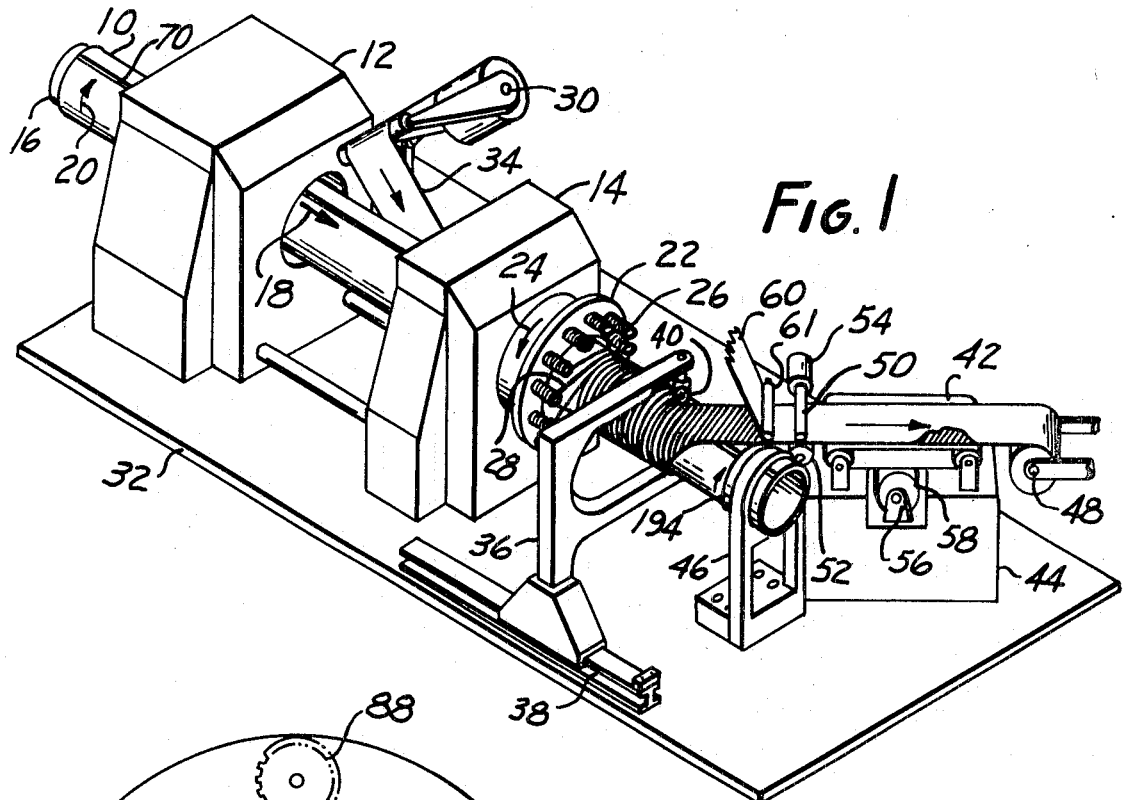
FIG. 1 is a perspective view of the apparatus according to the presently preferred embodiment of the present invention, together with a mandrel for use with such apparatus.

Referring to the drawings, there is illustrated a mandrel 10 given by mandrel drive mechanism 12 through winding head drive mechanism 14. Mandrel 10 is preferably a substantially cylindrical mandrel comprising a plurality of interlocking mandrel sections. Each mandrel section has a portion 16 having a reduced outside diameter adapted to mate within the corresponding cylinder portion of the next mandrel section.

Mandrel drive mechanism 12 moves mandrel 10 along its axis in the direction of arrow 18 and rotates the mandrel about its axis. With the apparatus in the condition as illustrated in FIG. 1, the direction of rotation of mandrel 10 is preferably in the direction of arrow 20. Winding head drive mechanism 14 is adapted to rotate winding head 22 about the axis of the mandrel, preferably in the direction illustrated by arrow 24 and opposite to the direction of rotation of mandrel 10. Winding head 22 supports payoff heads 26 which are adapted to apply filament material 28 to the mandrel. The number of payoff heads mounted to winding head 22 may vary in accordance with particular design criteria, depending upon ease of maintenance and number of filament rovings to be wound on mandrel 10 during each rotation of winding head 22 about the mandrel, and it is to be understood that one or more payoff heads may be used.

The particular filament material which may be used may be any suitable filament material, the choice of which depends upon strength factors, availability, and intended use of the completed bias material. For example, suitable filament materials for construction of bias material intended to be used for cord reinforcement construction of pressure vessels such as tires, include nylon monofilament and braided wire. As other example of filament materials, graphite yarn, boron fibers, beryllium wire, silicon carbide, aluminum boron silicate, beryllium glass filament and glass filament rovings may be used. The terms "filament cord" and "filament winding material" as used herein are intended to include all filament roving materials, as well as nylon, rayon and wire cord, which could be used for constructing bias material. The particular material used is a matter of choice and is not limiting on this invention.

Roller 30 is mounted to frame 32 which supports mandrel drive 12 and winding head drive mechanism 14. Roller 30 is adapted to supply a suitable continuous sheet of supporting material 34 to the mandrel surface before the mandrel moves past winding head 22.

It is to be understood that in certain circumstances the supporting material may not be necessary. For example if the filament material includes a suitable bonding agent, such as an epoxy resin, the filament material may be bonded together on the mandrel and the supporting material is not necessary. Alternatively, if the filament material includes no bonding agent to bond the successive convolutions of filament material together, the supporting material may be used. If the supporting material is used, the choice of the particular supporting material depends upon the choice of filament material and the intended use of the bias material. For example, in the case of the production of bias material for tire and cord construction, the supporting material may be a rubber sheet backed with a suitable carrier material such as polyvinyl acetate. The rubber sheet may include a bonding agent so that the filament windings are bonded to the rubber. Alternatively, suitable heaters may be used within or adjacent mandrel 10 to melt the rubber and permit the filament material to be partially encased within the rubber sheet. Other examples of supporting materials include cloth fabric, woven synthetic cloth and the like.

Figure 5:
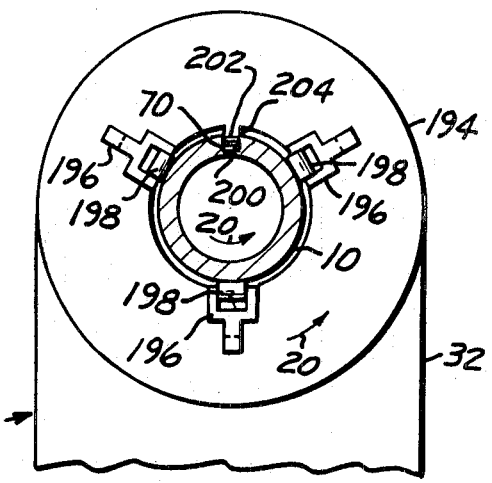
FIG. 5 is a section view taken at line 5—5 in FIG. 4.

A variable angle cutter mechanism 36 is mounted to track on track 38 which in turn is mounted to frame 32. Cutter mechanism 36 includes cutter wheel 40. Cutter wheel 40 cuts the filament material, and the supporting material if used, from the mandrel to form ribbon 42 which in turn is removed from the mandrel by takeup mechanism 44. Guide mechanism 46, illustrated in greater detail in FIGS. 4–6, is mounted to frame 32 for guiding mandrel 10 past the cutter wheel 40.

Takeup mechanism 44 preferably includes a takeup roller 48 for removing the ribbon 42 cut from mandrel 10 and winding it onto rollers. Rollers 50 and 52 are mounted to takeup mechanism 44 and to control 54 to control the thickness of ribbon 42 cut from the mandrel. If the filament material and supporting material are to be bonded together, and the bond is not completed by simply contacting the two materials together, rollers 50 and 52 may be supplied with a source of heat (not shown) to effectuate a bond. By way of example, if the backing material is applied by resin, the rollers will heat the resin to bond the materials together. Alternatively, a separate heater (not shown) may be used. Other well known bonding techniques may be used, depending upon the bonding agent.

Roller 56 is mounted to takeup mechanism 44 and is adapted to apply suitable separator cloth 58 to ribbon 42. Separator cloth 58 is preferably of a type which will not adhere to ribbon 42 and provides separation between consecutive convolutions of ribbon material on roller 48. Examples of suitable separating material include non-bondable plastic films, cloth fabrics, and the like.

If desired, a second sheet of supporting material 60 may be applied over the filament material prior to regulation of the thickness of the material by control 54. The second sheet 60 of supporting material may be rolled on a suitable roller (not shown) and applied to the ribbon by means of roller 61.

Figure 3:
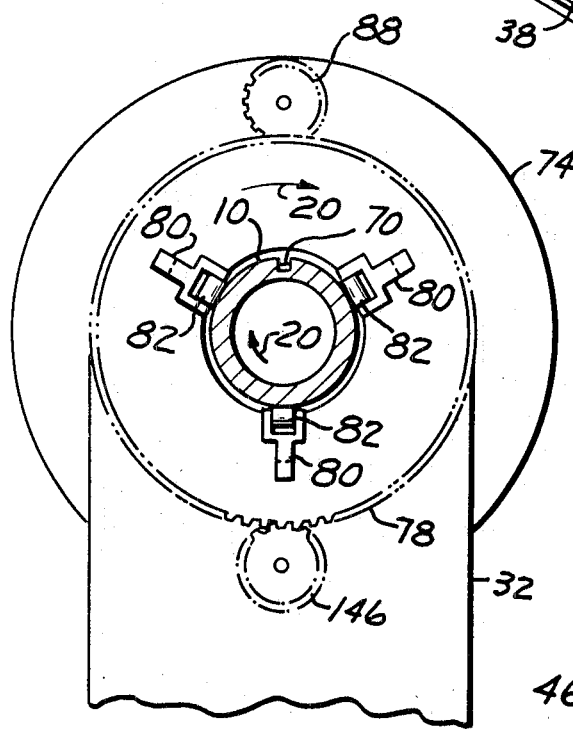
FIG. 3 is a section view taken at line 3—3 in FIG. 2.

In FIGS. 2 and 3 there is illustrated suitable drive mechanism for moving mandrel 10 along its axis and for rotating the mandrel about its axis, together with mechanism for rotating winding head 22 about the axis of mandrel 10. As illustrated in FIGS. 2 and 3, mandrel 10 preferably includes a longitudinal slot 70 having rack gear 72 formed in the bottom thereof. Mandrel drive mechanism 12 comprises housing 74 journaled to frame 32 by means of bearings 76. Housing 74 is mounted to gear 78 which rotates the housing. A plurality of roller mechanisms 80 is mounted to housing 74 and gear 78 and includes rollers 82 adapted to abut the surface of mandrel 10. Roller mechanisms 80 provide coaxial location of mandrel 10 within housing 84 and gear 78.

Gear 84 is journaled to housing 74 by means of bearings 86 and is separately rotatable. Gear 88 engages gear 84 and includes a shaft 90 journaled to housing 74 by means of bearing 92. Pinion gear 94 is mounted to housing 74 and engages rack gear 72 on mandrel 10. Shaft 90 drives 90°-direction-changer 96 which in turn drives pulley 98. Pulley 98 drives belt 100 to drive pulley 102 on pinion gear 94. Dog 104 is mounted to housing 74 and is adapted to register with slot 70 on mandrel 10.

It can be understood from the drawings that rotation of gear 78 will cause housing 74 to rotate about the axis of mandrel 10 thereby driving dog 104 about the axis of the mandrel which rotates the mandrel. Furthermore, rotation of gear 84 with respect to housing 74 causes rotation of gear 88, thereby driving pinion gear 94 in the direction of arrow 106 to move the mandrel in the direction of arrow 18.

To obtain the motions heretofore described, the motor 110 is connected by means of shaft 112 to mandrel drive gear reducer 114 which in turn drives pulley 116. Pulley 116 drives belt 118 to drive pulley 120. Pulley 120 is connected by means of shaft 122 to gear 124 which engages gear 84. Gear 124 also engages sun gear 126 of differential 128.

Differential 128 comprises sun gear 126 and spider gears 132 and 134 engaged thereto. Shafts 136 and 138 are journaled to spider gears 132 and 134, respectively, and are fixed to housing 140. Sun gear 142 engages spider gears 132 and 134. Shaft 144 is journaled to sun gears 126 and 142 and is fixed to housing 140.

Sun gear 142 engages gear 146 which in turn engages gear 78. Gear 148 engages gear 126 of differential 128 and drives shaft 150 to drive mandrel drive ratio selector gear box 152. Gear box 152 drives shaft 144 of differential 128.

Assuming the ratio selector gear box 152 is adjusted so that shaft 144 rotates in the same direction and at the same speed as sun gear 126, housing 140 mounted to shaft 144 causes rotation of spider gears 132 and 134 about shaft 144, thereby rotating the entire differential. Since shaft 144 is rotating at the same speed and direction as sun gear 126, no rotational force is applied to spider gear 132 and 134 and they will not rotate about their own axes. Instead, spider gears 132 and 134 rotate about shaft 144, thereby driving sun gear 142 in the same direction and at the same speed as shaft 144 and sun gear 126. In this condition, housing 74 and gear 84 are driven at the same speed and in the same direction. Since there is no relative rotation between housing 74 and gear 84, gear 88 is not rotated and the mandrel is not advanced in the direction of arrow 18. However, dog 104 mounted to rotating housing 74 drives mandrel 10 about its axis in the direction of of arrow 20.

If the ratio adjusted by gear box 152 is reduced so that shaft 144 rotates slower than gear 126, sun gear 126 imparts rotational force on spider gears 132 and 134 so that the spider gears, in addition to rotating about the axis of shaft 144, rotate about their own axes. The direction of rotation of the spider gears about their own axes is such as to drive sun gear 142 at a slower speed. Thus, housing 74 is driven at a slower speed about the axis of mandrel 10, and since housing 74 rotates at a different speed than gear 84, gear 88 rotates, thereby driving pinion gear 94 to advance the mandrel along the axis of the mandrel in the direction of arrow 18.

It can be shown that if the rotational speed of shaft 144 is half that of sun gear 126, sun gear 142 will not rotate, so that housing 74 will not rotate. In this condition, mandrel 10 advances along the direction of arrow 18 but is not rotated. It can further be shown that if the rotational speed of shaft 144 is less than one-half that of sun gear 126, housing 74 will rotate in the opposite direction from that indicated by arrow 20, thereby rotating mandrel 10 in the opposite direction while advancing the mandrel as indicated by arrow 18.

It is to be understood that bias material can be produced wherein the filament rovings are disposed at any selected angle between and including 0° and 90° to the length of the ribbon. As a practical matter however, the apparatus disclosed herein is more useful for production of bias material having filament material disposed at some angle between 0° and 90°. By way of example, apparatus according to the present invention has proven useful for producing bias material having a bias angle between 0.5° and 89.5°. As a practical matter however, most bias material has a bias angle between 15° and 75°.

As shown particularly in FIG. 2, winding head drive mechanism 14 comprises housing 160 mounted to winding head 22 and journaled to frame 32 by means of bearings 162. Winding head 22 includes payoff heads 26 adapted to wind filament material 28 onto mandrel 10. Gear 164 is mounted to housing 160 and engages gear 166 which is connected by means of shaft 168 to pulley 170. Pulley 172 is mounted to shaft 112 of motor 110 and drives belt 174 to drive pulley 176. Pulley 176 drives shaft 178 to winding head ratio selector gear box 180. Gear box 180 provides proper selection of the speed of rotation of shaft 182 which in turn drives pulley 184. Pulley 184 drives pulley 170 by means of belt 186.

During the cutting operation of cutting ribbon 42 from the mandrel by means of cutting wheel 40, certain difficulties may occur when the mandrel rotates to such a position that slot 70 is adjacent the cutting wheel. For this reason, guide means 46 is provided with a dog of extended length adapted to track within slot 70 beneath the cutting wheel. Guide mechanism 46 is illustrated in FIGS. 4–6 and includes housing 190 journaled to frame 32 by means of bearings 192. Guide plate 194 is mounted to housing 190 and includes a plurality of roller mechanism 196 having rollers 198 adapted to abut the surface of mandrel 10 to properly align the mandrel. Dog 200 is mounted to guide plate 194 and is in registration with slot 70 of mandrel 10. Dog 200 is of such extended length from guide plate 194 as to extend along slot 70 under cutting wheel 40 of the cutter mechanism. Dog 200 is positioned in slot 70 so that surface 202 closely approximates the revolved surface of mandrel 10. To prevent dog 200 from catching on and displacing successive windings of filament material, the forward end of dog 200 is preferably provided with a chamfer 204. As mandrel 10 moves in the direction of arrow 18, dog 200 will not bind on successive windings of filament material 28, and the dog provides a suitable surface for cutting wheel 40 to cut the material. Since dog 200 is in registration with slot 70, guide plate 194 is driven about the mandrel axis with the mandrel. Rollers 198 rotate with the guide plate and locate the axial position of the mandrel.

In operation, motor 110 (FIG. 2) rotates winding head 22 about the axis of mandrel 10, rotates mandrel 10 about its axis, and drives the mandrel along its axis. The speed of rotation of the winding head and mandrel about the axis of the mandrel and the speed at which the mandrel is driven along its own axis are selectively adjusted by means of gear boxes 180 and 152. Supporting material 34, if it is to be used, is continuously wound on the rotating and advancing mandrel 10 by continuously drawing material 34 from roller 30. As the mandrel advances and rotates past the rotating winding head, filament rovings are continuously wound about the mandrel in a helical pattern. The pattern of the helical winding selected is dependent upon the speed and direction of rotation of the mandrel and winding head 22, the number of payoff heads 26, and the axial speed of the mandrel.

The speed of rotation of the mandrel and the longitudinal speed of the mandrel are determinative of the bias angle of the bias material withdrawn from the mandrel and the rate at which the bias material is removed being dependent upon the rotational speed of the mandrel. By rotating the winding head about the rotating mandrel, each filament supply provides several convolutions of filament material in the mandrel for each revolution of the mandrel. Thus, the number of filament supplies necessary need not be as great as the number of supplies used in prior apparatus.

The number of payoff heads 26 on winding head 22 may be selected for optimum production procedures. Since the number of payoff heads determines the number of filament windings on the mandrel for each revolution of the winding head about the mandrel, the speed of rotation of the winding head is dependent upon the number of payoff heads used and the filament density (number of filament convolutions per unit length of the mandrel) desired for the finished bias material.

Ribbon 42 is cut from the mandrel by means of cutting mechanism 36 and is continuously wound upon roller 48. Successive convolutions of ribbon are preferably separated by separating material 58.

As hereinbefore described, mandrel 10 comprises a plurality of interlocking mandrel sections, each mandrel section having a portion 16 of reduced diameter adapted to mate with the opposite end of the next mandrel section. As illustrated in the drawings, the mandrel is preferably tubular. The tubular design eliminates unnecessary weight so that the mandrel may be readily transported from one end of the winding apparatus to the other. As each mandrel section advances past guide mechanism 46, it is unlocked and removed from the succeeding mandrel section and moved ahead of the most forward mandrel section and connected to the mandrel continuously passing through the apparatus. The mandrel sections preferably interlock in such a position that longitudinal slots 70 and rack gear 72 on each mandrel section will be aligned. If desired, the apparatus may be provided with transporting track means (not shown) which will unlock and transport the mandrel sections from the exit end of the apparatus to the entrance end.

Bias material having filament material disposed at a bias angle opposite from that illustrated in the drawings may be produced by reversing the direction of rotation of mandrel 10 and cutting the ribbon in the opposite direction. For example, shaft 144 (FIG. 2) may be slowed to less than half the speed of sun gear 126 so as to rotate housing 74 in the direction opposite from that illustrated by arrow 20. Takeup mechanism 44 may be moved to the opposite side of the mandrel from that illustrated in the drawings, and cutter wheel 40 may be adjusted to a suitable angle below the mandrel to cut the bias material therefrom. If desired, the direction of rotation of winding head 22 may likewise be reversed.

In certain circumstances, it is desirable to prevent fraying of the cut ends of the filament material cut from the mandrel. For this purpose, a suitable adhesive tape applicator (not shown) may be used to apply adhesive tape to the filament material just ahead of the cutting mechanism to bind together the filament material. This procedure will bind together the cut ends of the filament material along both sides of the ribbon cut from the mandrel.

The present invention thus provides a simplified method and apparatus for producing bias material. The incident angle of the filament material in the bias material may be selectively adjusted to any suitable angle between 0° and 90°. The apparatus requires little or no maintenance and very little supervision by operators. By way of example, a single technician can operate several machines for producing bias material. The aparatus requires substantially less space than heretofore required for the production of bias material, and is more efficient and effective than apparatus heretofore known.

This invention is not to be limited by the embodiment shown in the drawings and described in the description, which is given by way of example and not of limitation, but only in accordance with the scope of the appended claims.

What is claimed:

1. Winding apparatus comprising: support means adapted to support a substantially cylindrical mandrel having an axis; first guide means for guiding filament material onto a mandrel supported by said support means; first drive means for rotating said first guide means about the axis of the mandrel supported by said support means; second drive means for rotating the mandrel supported by said support means about said axis; and third drive means for moving mandrel supported by said support means along said axis.

2. Winding apparatus according to claim 1 further including cutter means for cutting filament material wound on the mandrel supported by said support means.

3. Winding apparatus according to claim 2 further including takeup means for removing the cut filament material from the mandrel supported by said support means.

4. Winding apparatus according to claim 1 further including second guide means adapted to guide supporting material onto the surface of the mandrel supported by said support means, said first guide means being adapted to guide filament material onto the surface of the supporting material which is wound on the mandrel supported by said support means.

5. Winding apparatus according to claim 4 further including cutter means for cutting the filament material and supporting material wound on the mandrel supported by said support means to thereby form a ribbon.

6. Winding apparatus according to claim 5 further including takeup means for removing the ribbon from the mandrel supported by said support means.

7. Winding apparatus according to claim 1 further including a substantially cylindrical mandrel supported by said support means, said mandrel having a longitudinal slot and a rack gear, said second drive means including a housing and adapted to rotate about the mandrel and a dog mounted to said housing adapted to register with the longitudinal slot, said third drive means including a pinion gear supported by said housing adapted to register with said rack gear, and motive means for rotating said housing and said pinion gear.

8. Winding apparatus according to claim 7 wherein said motive means includes first gear means adapted to rotate about the mandrel axis to drive said pinion gear, differential means connected to said first gear means for rotating said housing, first selection means connected to said differential means for selectively adjusting to speed of rotation of said housing, and motor means for rotating said first gear means.

9. Winding apparatus according to claim 8 wherein said differential means comprises a first sun gear adapted to be driven by said first gear means, spider gear means engaged to said first sun gear, a second sun gear engaged to said spider gear means for rotating said housing, a shaft journaled to said first and second sun gears, said shaft being connected to said first selection means, and means on said shaft for rotating said spider gear means with said shaft, whereby said spider gear means is rotated about its own axis by said first sun gear and is rotated about said shaft by said first selection means, and said second sun gear is rotated by said spider gear means at a speed dependent upon the direction and speed of rotation of said spider gear means about its own axis and about said shaft.

10. Winding apparatus according to claim 9 wherein said first guide means includes a winding head, said first drive means including second gear means for rotating said winding head about the axis of the mandrel, second selection means for selectively adjusting the speed of rotation of said second gear means, said second selection means being adapted to be driven by said motor means.

11. Winding apparatus according to claim 7 wherein said first guide means includes a winding head, said first drive means including second gear means for rotating said payoff head about the axis of the mandrel, second selection means for selectively adjusting the speed of rotation of said second gear means, said second selection means being adapted to be driven by said motive means.

12. Apparatus for producing a ribbon of material having an extended length and having a layer of filament material disposed thereon, the filament material being disposed at an angle selected between 0° and 90° of the length of said ribbon, said apparatus comprising: a substantially cylindrical mandrel having an axis; first guide means for guiding filament material onto said mandrel; first drive means for rotating said first guide means about the axis of the mandrel; second drive means for rotating said mandrel about its axis; and third drive means for moving said mandrel along its axis.

13. Apparatus according to claim 12 further including cutter means for cutting the filament material wound on said mandrel.

14. Apparatus according to claim 13 further including takeup means for removing the cut filament material from said mandrel.

15. Apparatus according to claim 12 further including second guide means for guiding supporting material onto the surface of said mandrel, said first guide means guiding filament material onto the surface of the supporting material which is wound on said mandrel.

16. Apparatus according to claim 15 further including cutter means for cutting the filament material and supporting material wound on said mandrel to thereby form a ribbon.

17. Apparatus according to claim 16 further including takeup means for removing the ribbon from said mandrel.

18. Apparatus according to claim 12 wherein said mandrel includes a longitudinal slot and a rack gear, said second drive means including a housing for rotating about said mandrel and a dog mounted to said housing for registering with said longitudinal slot, said third drive means including a pinion gear supported by said housing for registering with said rack gear, and motive means for rotating said housing and said pinion gear.

19. Apparatus according to claim 18 wherein said motive means includes first gear means adapted to rotate about the mandrel axis to drive said pinion gear, differential means connected to said first gear means for rotating said housing, first selection means connected to said differential means for selectively adjusting the speed of rotation of said housing, and motor means for rotating said first gear means.

20. Apparatus according to claim 19 wherein said differential means comprises a first sun gear adapted to be driven by said first gear means, spider gear means engaged to said first sun gear, a second sun gear engaged to said spider gear means for rotating said housing, a shaft journaled to said first and second sun gears, said shaft being connected to said first selection means, and means on said shaft for rotating said spider gear means with said shaft, whereby said spider gear means is rotated about its own axis by said first sun gear and is rotated about said shaft by said first selection means, and said second sun gear is rotated by said spider gear means at a speed dependent upon the direction and speed of rotation of said spider gear means about its own axis and about said shaft.

21. Apparatus according to claim 20 wherein said first guide means includes a winding head, said first drive means includes second gear means for rotating said winding head about the axis of the mandrel, second selection means for selectively adjusting the speed of rotation of said second gear means, said second selection means being driven by said motor means.

22. Apparatus according to claim 18 wherein said first guide means includes a winding head, said first drive means including second gear means for rotating said winding head about the axis of the mandrel, second selection means for selectively adjusting the speed of rotation of said second gear means, said second selection means being adapted to be driven by said motive means.

23. A method of forming a ribbon of bias material having a layer of filament material, the filament material being disposed at an angle between 0° and 90° to the length of said ribbon, said method comprising the steps of: continuously rotating a substantially cylindrical mandrel about its axis; continuously moving the mandrel along its axis; continuously winding filament material over the mandrel by revolving a supply of filament material about the axis of the mandrel; cutting the layer of filament material at an angle between 0° and 90° to the axis of the mandrel to form a ribbon; and withdrawing the ribbon from the mandrel.

24. The method according to claim 23 wherein the filament material is wound onto the mandrel by means of a rotatable winding head, and said winding head is revolved about the axis of the mandrel in the opposite direction from the direction of rotation of the mandrel.

25. The method according to claim 23 further including applying a layer of pliable supporting material onto the surface of the mandrel, the filament material being wound onto the supporting material.

26. The method according to claim 25 further including winding the ribbon on a cylindrical reel, and separating successive convolutions of wound ribbon with separating material.

27. The method according to claim 26 wherein the filament material is wound onto the mandrel by means of a rotatable winding head, and said winding head is revolved about the axis of the mandrel in the opposite direction from the direction of rotation of the mandrel.

28. The method according to claim 23 further including winding the ribbon on a cylindrical reel, and separating successive convolutions of wound ribbon with separating material.

References Cited

UNITED STATES PATENTS

| | | | |
|---|---|---|---|
| 1,355,525 | 10/1920 | Baker | 156—174 |
| 1,661,184 | 3/1928 | Kmentt | 156—426 |
| 3,025,196 | 3/1962 | Burger | 156—426 |
| 3,041,230 | 6/1962 | Deihl | 156—426 |
| 3,467,507 | 9/1969 | Andreevskaya et al. | 156—174 |

BENJAMIN A. BORCHELT, Primary Examiner

T. H. WEBB, Assistant Examiner

U.S. Cl. X.R.

156—174